(12) United States Patent
Pomerantz et al.

(10) Patent No.: US 7,693,745 B1
(45) Date of Patent: Apr. 6, 2010

(54) ASYNCHRONOUS ITEM TRANSFER FACILITY, SYSTEM AND METHOD

(75) Inventors: Sarit Pomerantz, Kfar Saba (IL); Gideon Miller, Jerusalem (IL); Itzhak Pomerantz, Kfar Saba (IL)

(73) Assignee: Keba AG, Linz (AT)

( * ) Notice: Subject to any disclaimer, the term of this patent is extended or adjusted under 35 U.S.C. 154(b) by 1150 days.

(21) Appl. No.: 10/111,601

(22) PCT Filed: Oct. 26, 2000

(86) PCT No.: PCT/IL00/00686

§ 371 (c)(1),
(2), (4) Date: Jun. 24, 2002

(87) PCT Pub. No.: WO01/31827

PCT Pub. Date: May 3, 2001

(51) Int. Cl.
*G06Q 30/00* (2006.01)
*B65G 1/133* (2006.01)

(52) U.S. Cl. .................... 705/26; 414/786
(58) Field of Classification Search .............. 705/26–28
See application file for complete search history.

(56) References Cited

U.S. PATENT DOCUMENTS

| | | | |
|---|---|---|---|
| 3,746,130 A | | 7/1973 | Bullas |
| 4,950,119 A | * | 8/1990 | Nord et al. ................. 414/277 |
| 5,063,857 A | | 11/1991 | Kissel, Jr. |
| 5,113,351 A | * | 5/1992 | Bostic ........................ 700/236 |
| 5,158,155 A | * | 10/1992 | Domain et al. ................ 186/53 |
| 5,282,424 A | | 2/1994 | O'Neil |
| 5,472,309 A | * | 12/1995 | Bernard et al. .............. 414/807 |
| 5,595,263 A | * | 1/1997 | Pignataro ...................... 186/53 |
| 5,672,039 A | * | 9/1997 | Perry et al. .................. 414/280 |
| 5,725,124 A | * | 3/1998 | Bustos et al. ................ 221/211 |
| 5,816,443 A | | 10/1998 | Bustos |
| 5,860,784 A | * | 1/1999 | Schuitema et al. .......... 414/280 |
| 5,890,136 A | * | 3/1999 | Kipp ............................ 705/22 |
| 6,134,561 A | * | 10/2000 | Brandien et al. ......... 707/104.1 |
| 6,147,773 A | * | 11/2000 | Taylor et al. ................ 358/400 |

FOREIGN PATENT DOCUMENTS

| | | |
|---|---|---|
| FR | 2 563 987 | 11/1985 |
| FR | 2 643 479 | 8/1990 |
| FR | 2 667 963 | 4/1992 |
| FR | 2 702 734 | 9/1994 |
| WO | WO 97/02098 | 1/1997 |

OTHER PUBLICATIONS

Simms et al., European Patent [EP1250670], Automated Receiving and Delivery System and Method, Nov. 9, 2000.*
Supplementary Partial European Search Report for Corresponding European Application No. 00971682.0.

* cited by examiner

*Primary Examiner*—Matthew S Gart
*Assistant Examiner*—Garcia Ade
(74) *Attorney, Agent, or Firm*—Alston & Bird LLP (57) ABSTRACT

Transferring a package from a source location to a target location, including obtaining the package from a shipper at the source location, the package containing no indication of the target location; affixing to the package a unique identifier; storing, in a package routing system, the unique identifier, and associating therewith, information identifying the target location; transporting the package toward the target locations associated with the unique identifier; and delivering the package to the target location associated with the unique identifier in the package routing system.

12 Claims, 6 Drawing Sheets

ASYNCHRONOUS ITEM TRANSFER FACILITY, SYSTEM AND METHOD

This application is the US national phase of international application PCT/IL00/00686 filed 26 Oct. 2000 which designated the U.S.

FIELD OF THE INVENTION

The present invention relates to the automated transfer of objects among remote parties, particularly for dealing with various aspects of object handling, such as delivery, pickup and return of items of merchandise ordered via a communications network, such as the Internet.

DEFINITIONS

The terms "storage structure," "delivery container," and "storage container" are used interchangeably to mean the physical structure in which items for transfer are stored while awaiting pick up.

The term "item transfer facility" is used to mean the storage structure/delivery container/storage container when taken together with the various control and database software and hardware peripherals, so as to function as a complete unit facilitating item transfer in accordance with the present invention.

The term "sender" is used to mean any system user initiating the sending of an item through the system, to an "addressee," who is any party authorized to receive items through the system. Depending on the circumstances, both the sender and the addressee can be a merchant/vendor, customer/consumer, or any forwarding or shipping agency associated therewith. While the sender and addressee will thus, in many cases, be a seller and purchaser, they may also be constituted by different personnel of a large company that wishes to use the system of the invention to ship goods, spare parts, inventory, or other items among different company facilities. Accordingly, unless stated to the contrary, all of the above types of sender and addressee, as well as functional descriptions of acts performed thereby, are deemed to be substantially interchangeable.

BACKGROUND OF THE INVENTION

The proliferation of consumer purchasing through catalogues and the Internet has been seen to create an increasingly severe bottleneck around the physical delivery of purchased items to the consumer, and returning rejected items back to the merchant.

As most of the purchased items are physical objects, and as the vendor is typically remote from the consumer, there is a need to physically deliver the purchased item from the warehouse of the vendor to the home of the consumer.

This delivery is currently done via two main methods:

Traditional package pick-up. The merchant sends the item to the nearest point where the consumer can pick up the package. Typically this is the local post office or other package acceptance service. The consumer is notified that a package has arrived for them, the consumer comes to the post office, identifies himself or herself, and the post office hands the package to the consumer.

Home delivery. The merchant sends the package to the consumer's address via its own fleet, or using a commercial delivery company such as Federal Express® or UPS®. The package is then delivered to the home of the consumer, who must sign for it in order to take delivery; alternatively, the package may be placed in the consumer's mail-box or specialized package-acceptance box.

Both of these methods suffer from clear deficiencies in convenience, cost and security when applied to e-commerce, as well as to other consumer direct marketing.

The main deficiency of traditional package pick-up is inconvenience. The consumer has to come to the post office during limited hours to pick up the package. The special trip to the post office, and the need to park the car, stand in line and carry the package back to the car, removes much of the advantages of telephone or Internet shopping.

Home delivery has two major deficiencies: it is inefficient for the merchant, and inconvenient for the consumer.

In particular, from the point of view of the consumer, he needs to plan to be at home to meet the delivery, and risks letting a stranger (namely, the delivery person) into the privacy of his home.

Furthermore, from the point of view of the vendor, the delivery driver has to look for an address that he or she may not be familiar with, look for parking in an unfamiliar area, and find and hand-carry the item from the truck. If the consumer is not home, a second or third visit may be required. When the purchased item has a low price tag, such as a book, a shirt or a gourmet food item, the cost of delivery becomes a high percentage of the total cost.

In addition, these problems can still be considered in the context of non-interacting, individual deliveries—the number of delivered items per neighborhood per hour is small enough not to create secondary problems of "friction" between the delivery trips (parking conflicts, disturbing neighbors, occupying elevators).

If the increase in volume of e-commerce meets current estimates, however, namely, a ten fold increase during the next few years, where both the variety of items and the percentage of electronic shoppers will increase—the problems mentioned above will be multiplied exponentially by the friction between coinciding deliveries.

Recently, there have been some relevant innovations, but they do not significantly improve the situation:

1. "Smart Box"—a lock-box service in which a specialized container is placed at the consumer's residence. Delivery services can place items in this lock-box and only the authorized consumer can remove them. This service allows packages to be delivered while the consumer is not home, but it still requires the delivery van to be driven to the consumer residence.

2. Package Acceptance Services—various businesses, such as convenience stores, have started accepting packages on behalf of consumers. Employees of these businesses accept packages from delivery companies and later hand them to consumers who come to pick them up. While convenient, these services are limited because they rely on manual handling of the packages. This is costly on a per-package basis. It also introduces an extra risk of mishandling.

SUMMARY OF THE INVENTION

The present invention seeks to address the above issues and improve fulfillment cost-efficiency, inventory control, and consumer convenience.

It is an object of the present invention to provide a system and method for delivering a package to an automated location to await pickup by an intended recipient.

It is another object of the present invention to permit the recipient to identify himself at the point of pick-up, for example, using a credit card. It is an object of the present invention to provide a system for distribution of addressed packages to addressees/recipients including a storage space with addressable storage locations, such as bins or lockers, that are not pre-assigned to specific addresses; a system for directing packages to available storage locations in the storage space; a system of informing a recipient that a package is waiting for them in the storage space; a system for identification of the recipient; a system for enabling the recipient to know if there are packages awaiting them for pick up, and to retrieve their packages from the storage space.

It is another object of the present invention to provide a system for returning merchandise from consumers to vendors, having multiple storage facilities, a system for directing packages to available storage locations in a specified storage facility, a system of informing a vendor that returned packages are waiting for them in that storage facility, a system for identification of the vendor's agent or the shipping company agent and a system for enabling the vendor agent to retrieve their packages.

It is another object of the present invention to provide an automated point-of-pickup for packages at a convenient location for a consumer, where the consumer is already using a credit card (for example a gas station), and where the consumer is notified of a waiting package as a result of using the credit card in an unrelated transaction.

There is thus provided, in accordance with a preferred embodiment of the invention, an asynchronous item transfer facility which has a storage structure containing a plurality of non-pre-assigned storage locations for items selected via a communications network for delivery from a sender to an addressee, and includes a first sub-system for receiving items from a sender and for routing the items to available storage locations in the storage structure; a second sub-system, associated with the first sub-system, for informing an addressee of the presence of an item in the storage structure; a user interface for facilitating selection by a user of one or more modes of operation, including a pick up request by an addressee; a third sub-system for identification of an addressee; and a fourth sub-system, associated with the third sub-system, facilitating the retrieval by the identified addressee of an item addressed thereto, from the storage structure.

Additionally in accordance with a preferred embodiment of the invention, the plurality of storage locations includes a plurality of non-pre-assigned storage locations.

Further in accordance with a preferred embodiment of the invention, the storage structure is an automated robotic storage container.

Additionally in accordance with a preferred embodiment of the invention, the storage structure is an array of lockers connected to a remote control and monitoring facility via the communications network.

Further in accordance with a preferred embodiment of the invention, the array of lockers are separated by movable partitions.

Additionally in accordance with a preferred embodiment of the invention, the second-subsystem includes a data transfer system operative to communicate with a computerized transaction interface so as to display item location data thereat.

Further in accordance with a preferred embodiment of the invention, the second-subsystem includes a data transfer system operative to communicate with a preselected portable communication device so as to display item location data thereat.

Additionally in accordance with a preferred embodiment of the invention, the storage structure also includes provided apparatus for providing predetermined environmental storage conditions at least predetermined ones of the storage locations, required for suitable storage of known addressed items.

Further in accordance with a preferred embodiment of the invention, the apparatus for providing environmental storage conditions includes cooling apparatus.

Additionally in accordance with a preferred embodiment of the invention, the first sub-system for receiving items from a sender and for routing the items to available storage locations in the storage structure, includes an automatic conveying system.

Further in accordance with a preferred embodiment of the invention, each item has a machine readable indicia thereon, and the automatic conveying system includes apparatus for automatic reading the indicia, and for updating a database with output data corresponding to information represented by the indicia.

Additionally in accordance with a preferred embodiment of the invention, the fourth sub-system is further operative to facilitate re-addressing of an addressed item to an alternate addressee, and the second sub-system is operative to inform the alternate addressee of the presence of an item in the storage structure, awaiting pick up by the alternate addressee.

Further in accordance with a preferred embodiment of the invention, the user interface is operative to facilitate selection by an addressee of at least one of the following modes of operation:

a) return of an item to a sender after collection by the addressee; and
b) return of an item to a sender prior to collection by the addressee.

Additionally in accordance with a preferred embodiment of the invention, the user interface is located remotely from the storage structure, and is connected thereto via the communications network.

In accordance with a further preferred embodiment of the invention, there is provided a method for the asynchronous transfer of items sought to be sent from a sender to a recipient, including:

selection of a destination transfer facility for an identified item sought to be sent to a known addressee;

conveying the item to the selected transfer facility at a time selected by the sender of the item;

entering the identification of the item and the addressee into a database which is at least accessible by a controller associated with the selected transfer facility;

storing the item in a known storage location within the selected transfer facility;

receiving at a time selected by the recipient, a request for release of the item from a recipient;

validating said request; and releasing the item to the recipient.

These and other objects of the invention will become apparent with reference to the following text.

In particular, the present invention seeks to provide automated transfer of objects among remote parties, in the context of merchandise ordered by a customer via a computer network, in the following manner:

1—a specific storage structure, hereinafter also variously referred to herein as delivery container or storage container, is designated as the delivery address for an item of merchandise ordered, for example, via the Internet. The designation may be effected by a sender, and/or a receiver, and/or a shipping company.

2—the item is delivered to the designated delivery container, by the merchant, delivery company, or other service.

3—the container automatically accepts the item, and dynamically allocates a unique physical storage space therefor.

4—the authorized customer comes to the container to retrieve the ordered item. This can take place at any time following the delivery. Following appropriate identification and authentication, the container presents the item to the customer.

It is a specific aim of the invention to provide a smart delivery container which is capable of interaction with information systems which may be necessary to accomplish and record the above transaction.

It is yet a further aim of the invention to provide a smart delivery container wherein the physical location of the item therewithin is dynamically linked to the logical status of the transaction. For example, an item already in the container can be re-designated so that it cannot be retrieved by the original customer, but by a newly designated customer. Similarly, in the event that it is decided to "stock" particular items in the delivery container before a customer been designated, one or more such items can thereafter be designated and thus made available to the customers for pick-up.

As described above, an item can be delivered to a container before a recipient has been designated. Accordingly, with proper planning, the apparatus of the present invention can be used as a distributed inventory system, providing distribution of a vendor's goods over a wide geographic area that is intended to resemble the distribution of sales.

In a preferred embodiment of the present invention, a forecasting and scheduling system would be used to determine an efficient distribution of the goods over a geographical area. Then, a system of intermediate deliveries could be used until the goods are ordered by the ultimate consumer. Such forecasting and scheduling systems are within the capabilities of a person skilled in the art. Such a system would also be useful for the distribution of component parts to geographically diverse manufacturing stations.

A particular advantage of the present invention is the method of product delivery among merchants, consumers, and delivery companies, using delivery containers, located at sites that are easily accessible to the shipping company and frequented by the consumer, and wherein container can be linked to remote information systems which contain critical information and rules about any transaction that may be effected.

More specifically, the method of the present invention is a method of distributing items of merchandise among sender, receiver, and shipping company, and which may be characterized generally as bi-directional, automated, asynchronous, uninterrupted control, and open; and more specifically, as follows:

Bi-Directional—items can be transferred from sender to receiver and returned from receiver to sender via the same system Automated—the system does not require manual processes and therefore is well suited to low cost-per-package implementations and 24 hour a day, 7 day a week availability Asynchronous—the system allows packages to be transferred between delivery company and receiver without the two having to interact directly Uninterrupted control—the location of the package is known and securely controlled at all times between the time it leaves the control of the delivery company and the time it enters the control of the recipient Open architecture—the system can handle any number of senders, receivers, and delivery companies.

In a preferred embodiment of the present invention, at least one manual or automatic delivery container is installed at a location that is frequented by potential consumers, such as a neighborhood gas station, a shopping mall parking lot or an industrial park.

It should be clear that the level of automation of the delivery container could vary from a simple storage room to a fully automated warehouse. The operation of the container network can be done by a container-service company, by the vendor or by the local host.

The transfer facility, preferably implemented as a "smart" warehousing/delivery container, or as a set of electronically controlled lockers, automatically accepts, temporarily stores, and then automatically presents shipped items to authorized customers.

In practice, a delivery truck may deliver a relatively large number of items to a plurality of local delivery containers. The items are loaded into the delivery container, automatically stored in available storage locations, normally provided as shelves or dynamically allocatable lockers, updating the local and remote inventory records about their presence and exact storage location.

A consumer can then be notified by any of several alternative means of communication, that a shipped item is waiting for him in a delivery container at a specific location. The container may either be a consumer-designated preferred container, if such was specified at the time of ordering, or any other container determined by the supplier or shipping company to be that most convenient to the geographical location of the consumer. The consumer, having been notified of the arrival of an item, upon their next routine or special visit to the delivery container site, identifies themselves, typically using the same credit card that was used for the purchase, or by any other suitable means of identification, and automatically receives the package through a built-in pick-up window, or retrieves it from the locker allocated by the system to his particular delivery.

It will be appreciated that the asynchronous, automated nature of the present system also lends itself to the return of items. Returned items can be delivered by the consumer back to the vendor via delivery truck, by loading them back into the container through the pick-up window or into a locker dynamically allocated by the system. The returned items will automatically update the inventory, and will be picked up by the shipping company upon the next delivery visit, or reassigned to a different consumer, if appropriate.

General Description of the Invention

The present invention is a method for transference of items from senders to recipients using an infrastructure of automated item transfer facilities, linked to local and remote information systems.

The transfer facility storage structure or delivery container is preferably an automated storage container, such as the automated video cassette dispenser manufactured by Shafir Engineering from Hataas Street, Kefar-Sava, Israel that can automatically accept, store, and deliver packages. It has a pick-up door, used by the shipping companies to load deliverable packages and collect returnable packages, and a customer pick-up window, used by consumers to check out delivered packages and check-in returned products.

In accordance with a preferred embodiment of the invention, these facilities are located in places that are routinely visited by consumers driving their cars, such as gas stations, supermarkets, convenience stores, mall parking lots, industrial parks and fast food centers.

Additionally in accordance with a preferred embodiment of the invention, the automatic conveying system of the storage container can automatically read a label on the package, such as a barcode, and update its database about the sender, recipient, contents, special storage requirements, storage expiration date, etc.

Further in accordance with a preferred embodiment of the invention, the sensors in the container loading and downloading doors, and the information read from the labels, provide information that detect irregular loading behavior, suspicious movements, tampering with the storage system etc. and alert local or remote security personnel.

Yet further in accordance with a preferred embodiment of the invention, a diagnostic system in the container responds to failures in operation, or in the special storage conditions, and alerts the service company. Such a diagnostic system can include temperature sensors, accelerometers etc.

Preferably, a consumer can select a preferred delivery container location in his neighborhood, or any other specific container location, and specify this container for delivery when ordering a product by telephone or by Internet.

The system includes a database of centralized, dynamically updated information that can be accessed at the time or ordering, regarding options for delivery to container location. In particular, a web-page that would automatically pop-up when a customer requests that his purchase be delivered to a container rather than to his physical address. This web page would provide a dynamically updated list of available containers perhaps keyed to his zip code, credit-card information, or other information. This list could be dynamically adjusted to reflect changes in the availability of container space and also allow space in a given container to be reserved for a given purchase. This web-page could be managed by a third-party entity and provided as a service to merchant web-sites and call-centers.

Specifying a container for delivery, will typically make the shipment cost lower, and may reflect in a discount in the price of the purchase. The receiver may pay additional charges for extra storage time before pick-up.

In a preferred embodiment of this invention, a portion of the storage structure may be refrigerated, and yet a further portion may function as a freezer; the storage mechanism of the container may also be built so as to maintain packages level, so as not to tilt or accelerate them, so that packages that are marked for refrigeration, deep freezing or those requiring a specific orientation, often denoted by labels bearing the inscription "this side up," can be safely delivered. Preferably, the system of the present invention would automatically detect such storage and transportation requirements.

Alternatively, the system of the present invention may use the information associated with the item's identifier to determine, and satisfy the storage requirements of the particular item. The shipping company can team with the operators of the local stores and businesses in the delivery container site, and update their databases on items in storage at the local delivery container. This will enable the operators of this business to notify a customer, at the point of sales, that there is a package waiting for them at the delivery container. Such coordination will create value for the local business.

Other possible ways to notify a consumer of the arrival of his awaited packages in the delivery container, is by way of an electronic message delivered to a portable terminal such as a cellular phone, or via e-mail. The consumer will typically be invited to specify a desired mode of notification upon making the purchase, or as a part of their subscription information.

The consumer may also simply visit the container when convenient and check whether a package has been delivered, whether notified or not.

Due to the automated nature of the system generally, and specifically that of the delivery container, the consumer may arrive at any convenient time, and approach a pick-up window whereat he identifies himself to the delivery container control system. Such identification is preferably performed by use of a magnetic card, such as a credit card or smart card. Subsequently, the consumer will choose an option, for example, package collection.

The control system including appropriate software, control circuitry, (and input/output devices), verifies the identity of the consumer, optionally including a requirement for entry of a PIN (personal identification number). After positive identification of the consumer, the system will then check the inventory for packages awaiting him, thereafter retrieving any relevant packages from their storage location within the container, and conveying them to the pick-up window. The consumer can then transfer the packages to his car, in order to thereafter bring them home.

In accordance with a preferred embodiment of the invention, the container could be placed, for example, in proximity to a location having a computerized transaction interface, such as at a gas station, whereat the consumer would in any case identify himself when making a purchase. In this embodiment, the inventory database of delivered items waiting for collection by the consumer, including the identities of the intended consumers, would be made available to a database system associated with computerized transaction interface.

Accordingly, when the consumer makes his or her purchase by use of the computerized transaction interface, such as a purchase of gasoline at a filling station, the transaction system would automatically search for the consumer identity in the inventory database. On matching the identity of the consumer with a package awaiting collection, a display forming part of the interface could be used to inform the consumer of this fact. Alternatively, this information may appear on a receipt or other printed output received by the gas station cashier. Optionally, there may also be provided a selector device, which could either be a selection key connected to the transaction interface, or a mobile telephone function, for example, which would enable immediate release of the package, such that it would be waiting for the consumer at the delivery window of the container, or by remotely opening the door of the locker that contains the package. A transfer facility could, alternatively, be located at a shopping mall where the consumer regularly shops. Accordingly, when the consumer purchases an item of merchandize via a computerized transaction interface, he would be alerted to the presence of a package awaiting collection. Many variations to the foregoing will be apparent to one skilled in the art.

It is also preferable to have a camera to record the identity of the person retrieving the package, for additional verification purposes. This would be particularly useful for determining collection of a package, in the event of a dispute between a vendor and a consumer, in which the consumer claims that he did not collect the package. Any suitable digital camera would preferably be used to permit the information to be stored and transmitted with the other data concerning the transaction. Such a system would further be useful in deterring fraudulent use of a stolen credit card, for example.

A similar method is used to enable consumers to return items to the vendor, without the need to carry them or mail them. The consumer places the item for return in the pick-up window of the storage structure, identifies himself to the system, and enters or selects a request to return the item. The system will determine whether to accept this return, such as by scanning the barcode on the package to confirm that the item is returnable, or by interacting with a central database or remote operator.

If the system determines that the item is returnable, it will convey it to an available storage shelf or, alternatively, allocate a specific locker to the transaction. Thereafter, it will print a receipt for the consumer, and will update the inventory list. The actual procedure of crediting the consumer for the returned item will preferably be determined in any suitable manner, by agreement between the vendor and the consumer.

In a preferred method of operation, the shipping company sends one or more delivery trucks to specified transfer facilities. Preferably, the drivers will familiar with the location of the facilities, and there will be a reserved parking spot for loading/unloading the storage container. The operator, typically the driver of the truck, will identify himself to the system using a password, a token or any other pre-defined method of identification; and will type or otherwise enter the number of packages to be delivered. The operator will then load the packages, one by one, into the pick-up door of the container. The conveying system of the delivery container will automatically scan the labels and store the packages at available storage locations. The system will classify the packages according to special storage requirements as marked on the label, such as "refrigerated," "deep freeze," or ordinary storage.

Typically, after the loading of packages into the container, the operator can initiate an unloading session for picking up any returned products that are to be picked up by his company, and use the free space in his truck to carry them back to the warehouse.

In case the number of packages delivered is more than the number of free storage locations in the delivery container, the system will display a message to that effect, and reject the excess packages. Preferably, consumers will be notified that a package has been delivered to a container only once delivery has been verified.

It should be noted that in accordance with a preferred embodiment of the present invention, the information systems resident in the containers are linked to a centralized database via any suitable wide area network, which may be copper, optic, wireless, or any other combination of these, or any other suitable type. Accordingly, in the event that a container is full, rather than delaying the delivery, the item to be delivered may be diverted by the system to an alternative facility nearby. This may be automatic, or the consumer may be sent a communication, asking him to choose between waiting for the package to be delivered at the selected container, and having it delivered immediately to a different container.

Clearly, although each transfer facility will typically have only a single storage structure or container, it is envisaged that a large site, such as a shopping mall, while functionally operating as a single transfer facility, may include several storage structures or containers at different locations within the shopping mall.

It will be clear that the above-described automated storage container is only one possible means of implementing delivery in accordance with the method of the present invention. The system of the invention may include various different types of storage structures, including a manned storage room, and operated by a dedicated operator or by the staff of the host business—such as the operators of a gas station whereat a delivery container is hosted. It is clear that such manned operation is preferable to a post office, for example, in as far as it renders delivered merchandize available 24 hours per day, seven days a week, as well as the possibility of enabling at the pick-up window. Yet another alternative method of this delivery method is the ability to use a manual intelligent locker array, as described hereinbelow.

Another feature of the present invention, is the ability of the addressee or shopper to cancel the order not only after ordering, but even after it has been shipped, but prior to collection. The sender, which may be the vendor or shipping company distributing items of merchandize on behalf of the vendor, can then change the status of the package as listed in the system database from "waiting to be picked up" to "waiting to be collected for return", and it will be automatically delivered to the delivery truck upon its next visit. This feature enables the addressee to change his mind concerning a specific item, without a need to handle the package. The vendor or the shipping company may charge a fee for cancellation of an order after it has been shipped, in order to cover the cost of the round trip from the warehouse to the container and back, but this cost will typically be much smaller than the cost of full path delivery and return. In addition, should another system user wish to receive the cancelled item and wish to collect it from the same facility, the system can re-designate the cancelled item, changing its status back from "waiting to be collected for return" back to "waiting to be picked up," but for the new customer.

Another feature of the method of this invention, is the ability of the vendor to cancel a delivery after it has been shipped, at any stage prior to pick-up by the customer, or at least prior to the customer having been informed of delivery. The vendor may want to ship products immediately upon receipt of order, for competitive reasons or for better service. It may then find out that it does not want the item to be picked up by the consumer, for example, due to credit problems. The vendor can then issue an instruction that will cause the status of the package in the container to be changed from "waiting to be picked up" to "waiting to be collected", and the consumer will not be able to retrieve it. This gives the vendor an extra time for confirming its intention to deliver the product.

Another feature of the method of this invention, is that vendors can proactively use it to improve their customer service and fulfillment time. For example, vendors may choose to ship some items to a strategically located container in anticipation that they will be ordered by consumers nearby—for example, in conjunction with a specific promotion, or seasonal event, or as a result of sales forecasting. The items would then become available to nearby consumers for immediate pickup once they are ordered.

Another feature of the method of this invention, is the provision of a convenient way of recycling empty packages. The consumer can keep empty boxes in the trunk of his car, and deposit them in the container. The identifying label of the boxes, and or the identity of the consumer as they identify themselves, can serve to credit the consumer for each empty package returned. The empty packages can be stored in the container and be collected by the delivery truck. The recycling of empty boxes has an ecological value and reduces the cost of packaging new items.

It is also within the scope of the present invention to provide a scale for determining the weight of the packages. Such a function would permit the weighing of a package being returned to determine whether to accept it. In other words, if a consumer attempted to defraud the vendor by returning an empty package or a package missing one or more components, such an act could be caught by an acceptable range of weight on a scale. Similar weighing technology has successfully been used at the point of sale in connection with "self-checkout" systems.

Although the vendor would not necessarily provide credit until the return is complete, provision of a scale would provide another level of security, and fraud deterrence. The information on the acceptable level of weights could, for example, be associated with the return authorization.

In another embodiment, the UPC on a product could itself be used to store the nominal weight of the package at the time of shipment and/or delivery.

A further feature of note in the present invention is that, while there is a need for some addressing information to be placed on the package, there is no need for human readable addressing, per se. Accordingly, a product would not necessarily require re-packaging for shipping. The original packaging may thus be reusable, without re-boxing, with the simple addition of an identifier affixed thereto. Such an identifier could be a bar code label or a more detailed label, or could even take the form of a radio-frequency identification tag which may optionally be automatically removed from the parcel by the system prior to collection of a parcel by a consumer.

It is further within the scope of the invention to have the shipping company receive electronic shipping instructions and original manufacturer's packaging; have the shipping company automatically or manually tag the items as appropriate based upon the UPC on the manufacturers box; have the handling be substantially automated based upon the tag and the UPC (the latter which can have associated therewith storage specifications and handling instructions); to deliver and store the product in the relatively smaller manufacturers packaging; to remove the tag and deliver the goods to the consumer in the manufacturer's packaging without the need for additional packages.

It will be appreciated by persons skilled in the art, that the item transfer facility of the present invention acts as an asynchronous drop-off/storage/collection interface for an item sent from a first location to a second, remote location, independent of the nature of the sender and recipient. Clearly, the transfer of items may be commercial in nature, or it may form part of an internal distribution network for a corporation or other entity having operational centers in different geographical locations.

Beyond the various examples mentioned herein, and so as to emphasize the wide range of situations for which the present invention may be suitable, the following additional, non-limiting examples may also find utility with the present invention:

1. A brick-and-mortar establishment electing to have a container dedicated to its own business and adjacent to its own premises. For example, a duty-free shop where travelers purchase and pay for their merchandise on their outbound leg, but do not take the merchandise with them. Instead the merchandise is conveyed to a container, for example near customs, where they pick-up their merchandise upon their return.
2. A single establishment that uses a container for a specific remote fulfillment activity. For example, an office supplies vendor who would locate a container convenient to a plurality of potential customers (e.g., in an office park), and serve those customers by asynchronous delivery and pickup via the container.
3. If the delivery and/or pickup is itself performed by automation rather than an actual operator. For example, delivery vans with an automated conveyance system, similar to that used in storage structures 30 of the invention, which would then interface with the storage structures.
4. Enabling COD (cash-on-delivery) transactions in conjunction with a hosting establishment. For example, at a gas station hosting a transfer facility of the invention, the cashier accepts payment from a customer, and then through issuing a smart-key-card or through a command signal, the customer is able to pick up his package.
5. A traveler wishing to make purchases at various travel locations, would be able to request from a vendor that he sends the package through the system, to a transfer facility of the traveler's choice; typically, close to the home or office of the traveler, so that he can conveniently collect it after arrival.

BRIEF DESCRIPTION OF THE DRAWINGS

The present invention will be more fully understood and appreciated, from the following detailed description, taken in conjunction with the drawings, in which:

FIGS. 9a-11b are schematic representations of locker arrays having movable partitions, constructed and operative in accordance with further embodiments of the present invention.

DETAILED DESCRIPTION OF THE INVENTION

Figure 1:
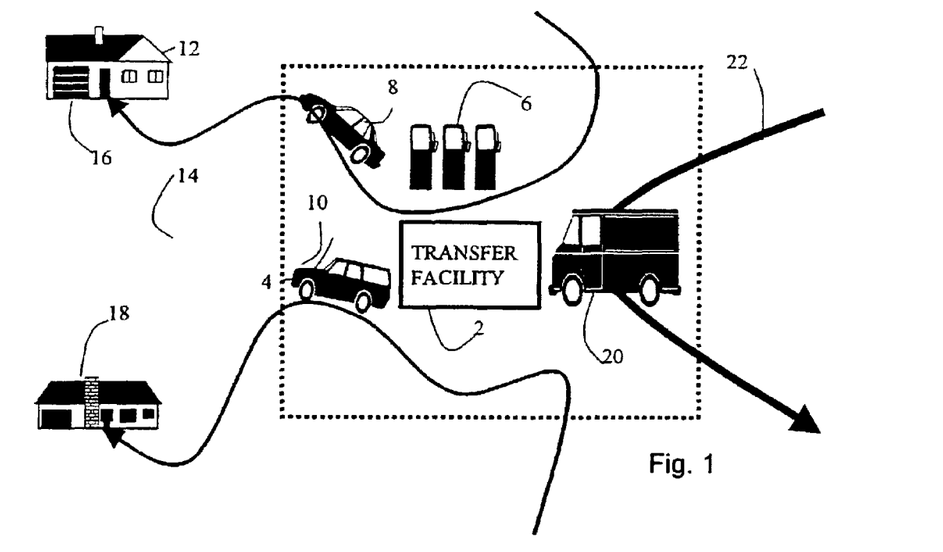
FIG. 1 is a block diagram representation of the system of the invention, exemplified by a single transfer facility, and its interaction with a supplier and addressees.

Referring now to FIG. 1, showing a general layout of the asynchronous item transfer facility and system of the present invention. The transfer facility (2), is exemplified as a "smart" storage container, and is located on the premises (4) of a site selected for its centrality and/or general convenience to a target community or market, such as a gas station (6), a shopping mall or an industrial park.

Consumers who live in dwellings (16, 18) in the vicinity of the transfer facility (2), may purchase items using their telephone or computer, via the Internet, for example; or by requesting at the time of purchase at a "brick and mortar" store, and specify the local transfer facility (2) as their desired delivery address. Alternatively, this may be automatically selected by the supplier or shipping company as being the facility located most conveniently to an intended recipient's address. A delivery truck (20), traveling at typically regular schedule, on a typically fixed and familiar delivery route (22), loads the delivery container at facility (2) with the items that were ordered, and specified for drop-off at that location.

Consumers (8, 10) may visit the site (4) at any convenient time, so as to collect delivered items from the transfer facility. The consumer can park the car by the delivery container, put the package in the car, and keep it there until returning home, reaching the a place of work, or other preferred destination, as indicated by arrows 12 and 14.

Figure 2:
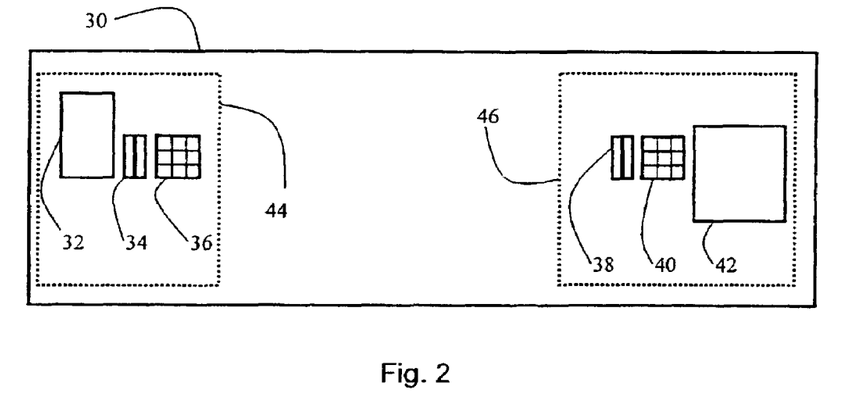
FIG. 2 is a simplified illustration of a storage container constructed and operative in accordance with a preferred embodiment of the present invention.

Referring now to FIG. 2, there is seen a simplified schematic illustration of an automated storage container that can be used in a preferred embodiment of the present invention.

A container 30, such as a standard metallic container used for shipment of goods on trucks, railroad cars or ships, is fitted to serve as an automated storage container. The general structure, internal design, electronic controls and computer software of such container are known in the art and are similar to those found in automated vending machines, and specifically in automated video-cassette rental machines where the machine is capable of both delivering and receiving an item, and of both charging and crediting the consumer in response to their operation. Such automated video rental machines are of the type provided by Computerized Machines Industries Ltd. of 9 Hayetsira St., Raanana, Israel. Like these vending machines, the container of the present invention is constructed so as to be secure against vandalism and theft, and is typically connected to an on-line alarm system and tamper detectors.

A significant difference between the cassette rental machines and the storage structure/delivery container of the current invention, is that the items in this invention are typically larger, and are packaged in different sizes of boxes.

Other differences between structure 30 and commercially available video rental machines include the inventive operation of the system and method, the software and the overall functionality of the present invention.

The container of the present invention typically has two user-functional sections on its external panel: a loading/unloading window 46, and a customer pick-up/return window 44.

The loading/unloading window (46) is used to load the delivery container 30 with items from the delivery truck, and in accordance with one embodiment of the invention, to unload from the pick-up door returned or unclaimed items into the delivery truck. The customer pick-up window (44) is used to enable a customer to collect an item belonging to him, and to receive items being returned by the customer.

While these two functional sections do not need to be close to each other, and can be on opposite sides of the container 30, they can optionally be unified into a single functional section, whose particular function depends on the type of user interacting with the facility at any given time.

Turning now to the loading/unloading window 46, three functional components are associated therewith, namely, a loading/unloading door (42), a personal identification module (40), and a control panel (38).

The loading/unloading door 42 is an opening or physical port that is used by the operator—typically the driver of the delivery truck, to load items into container 30 and to unload items therefrom. The opening 42 is preferably mechanically interfaced to a conveying system located within the automated storage system, such that, with the exception of maintenance, no personnel ever have to open the container and enter it, thereby rendering the system highly secure.

The personal identification module (40) is used to identify the operator, and to allow them access to the container. This will typically be a magnetic card reader, a smart card reader, a biometric sensor, an iris scanner, or any other suitable identification device.

The display and control panel 38 is used for communication between the operator and the computer system of the facility—typically for inventory management purposes, such as indicating the amount of free space in the container; indicating the number of items to be returned waiting in the container; and printing a receipt that confirms the number of items transferred between the container and the operator in a given loading session.

Figures 3, 4:
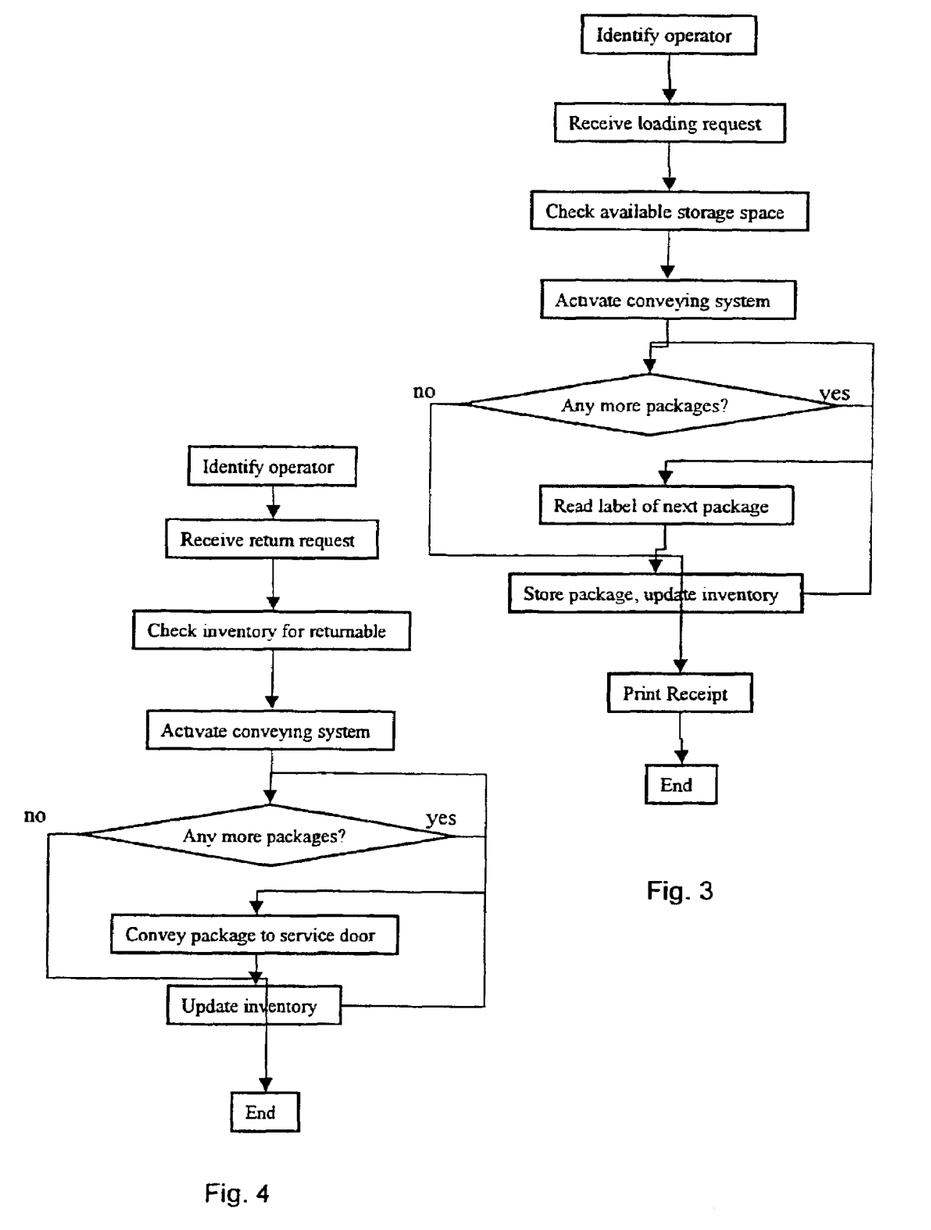
FIG. 3 is a flow chart showing basic steps in the loading of items into the storage container of the present invention by a vendor or shipper.
FIG. 4 is a flow chart showing basic steps in the unloading of items from the storage container of the present invention by a vendor or shipper.

A typical loading session, illustrated also in the flowchart of FIG. 3, involves the arrival of the delivery truck to the transfer facility, identification of the operator at the personal identification module, and the input of the request to start the session. These steps cause the container to activate the conveying system and open the loading/unloading door. Then the operator places the packages addressed to this container in the door, and the conveying system takes them in, identifies them by reading information on them such as a barcode label, stores them in a suitable vacant space in the container—taking into account their special storage requirements as marked on the label, and updates the internal inventory list.

When all packages are entered, the operator can use the control panel to request any returned packages that are stored in the container and designated for him. This unloading session is also illustrated in the flowchart of FIG. 4. The conveying system then brings all the returned packages that are intended for this delivery truck to the loading/unloading door, and the operator picks them and loads them into the truck. The operator can then terminate the session using the control panel. A receipt that lists all package numbers loaded and unloaded in this session can then be printed for the operator to take, and this terminates the loading/unloading session.

It should be noted that the labels on the delivered packages do not need to identify the recipient, and can contain nothing but an identification number. This allows the re-routing of packages from the original consumer to an alternative consumer in case of cancellation. It also allows the vendor to ship the package to a container before the item is ordered.

It should also be noted that when a delivery is cancelled—either by the consumer or by the vendor—the package will return to the fulfillment center without reaching the hands of the consumer, making the returned merchandise re-sellable, as compared to returned items that have been opened by the consumer, that are ordinarily not re-sold as new items.

The storage container can be served by/can serve one or more delivery companies.

Turning now to the customer pick-up section 44—it includes three functional parts—a pick-up/return window (32), a customer identification unit (34) and a control/display/print unit (36).

A typical service session involves the arrival of a customer to the storage container, his or her identification at the personal identification unit, and his or her input of a command on the control panel—typically a pickup request or a return request. The pickup request is also illustrated in the simplified flowchart of FIG. 5, and the package returning session is also illustrated in the simplified block diagram of FIG. 6.

Figure 5:
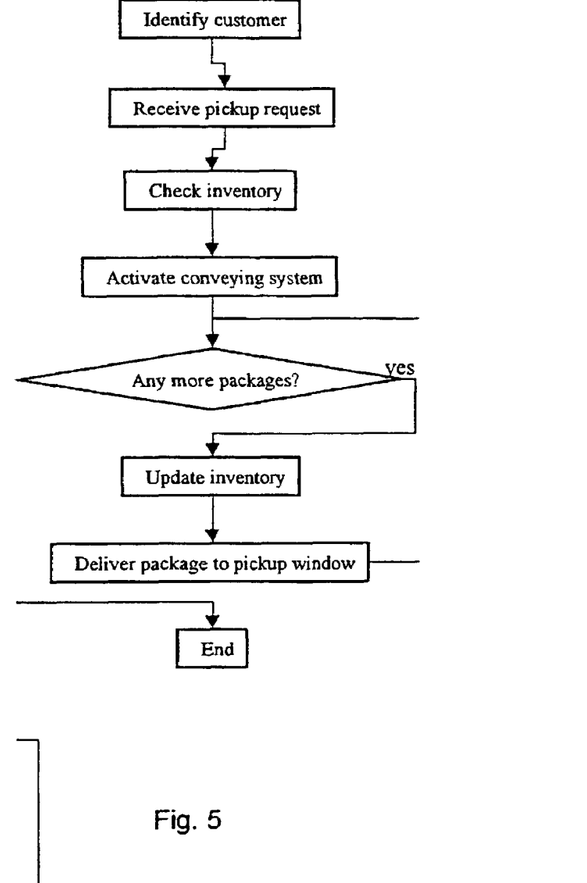
FIG. 5 is a flow chart showing basic steps in the collection of items from the storage container of the present invention by a recipient or addressee.

If the customer selects "pick-up," the controller of the storage container checks if there are packages for this customer, and if so—it conveys the packages one by one to the pick-up window, availing them to the customer to pick-up. The customer will typically move the packages to their car.

Figure 6:
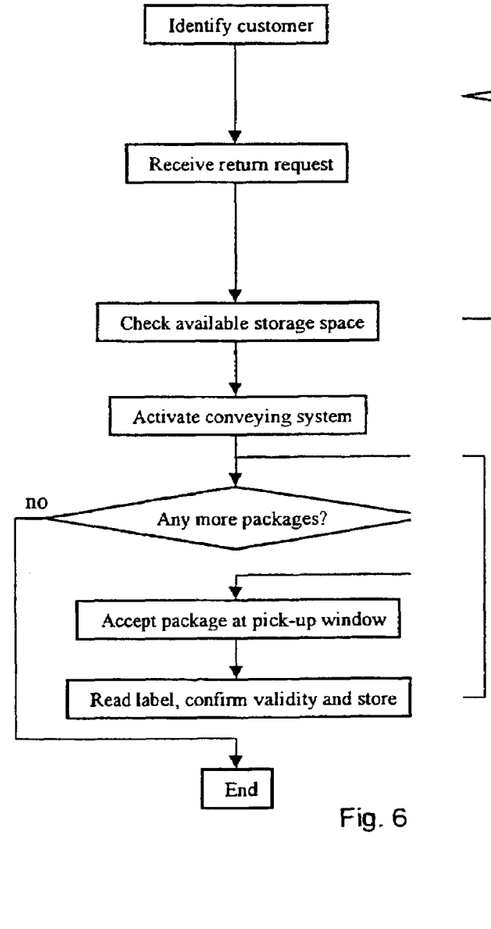
FIG. 6 is a flow chart showing basic steps in the return of items from the storage container of the present invention by a recipient or addressee.

If the customer asks to return a package, the controller of the storage container will open the pick-up window for receiving the package, will confirm that the package should be accepted for return (for example, by reading a bar-code label on the package, RMA form, or by communicating with a central database or remote operator), and will convey the package for temporary storage. Typically, the return session will include printing a receipt for the customer. If the system determines that the package is not returnable to this delivery container, then the package will be rejected—i.e. pushed back out through the pick-up window.

For sites where the amount of traffic is small and may not justify the complexity of an automatic container, this invention describes a different embodiment with a more simple version of the delivery container.

Figure 8:
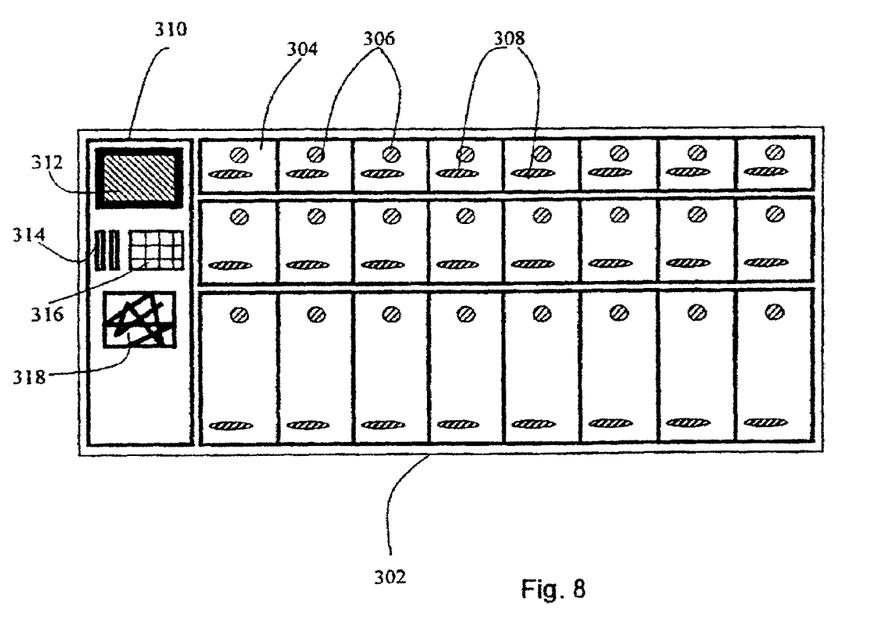
FIG. 8 is a schematic elevational view of a preferred embodiment of a storage facility.

Referring now to FIG. 8, there is illustrated, in accordance with a further preferred embodiment of the present invention, a distribution container 302 which includes a plurality of remote-controlled lockers 304, controlled by a local processor 310. The local processor 310 may have an interface with a remote processor for inventory and delivery instructions.

Each remote controlled locker 304 is a closed compartment with a door 308 that has at least 4 components that are electronically linked to a controller:

1. A visual or audio indicator 306, such as a lamp, or speaker, for a sensible indication capable of being detected by a user when located within a specified distance from the locker.

2. A sensor, such as a piezoelectric converter or a light beam/photocell combination, that can sense if the locker is empty or contains a package.

3. An electric lock, that is remotely controlled and can lock or unlock the locker door.

4. A sensor, such as a microswitch, that indicates if the door of the locker is closed.

The local processor 310, operative to control the plurality of lockers, includes a digital processor, a package ID reader (318) such as an omni-directional bar-code reader (such as in a grocery store check-out register) and a user-identifier unit 314 such as a magnetic card swipe reader, and a visual display screen 312. Other user identification technologies may be added or substituted, such as a keypad for entering a password, smart-card reader, technology based on communication with customer's PDA, cell-phone, or other mobile device, or finger-print scanner, or other authentication devices. Optionally it also includes a printer and a communication unit with a central database.

Preferably, the lockers are of various sizes, in order to optimize the storage capacity.

Preferably, the lockers are clearly numbered for easy visual identification of a locker, from a distance.

The lockers and the control units are built and arranged so as to provide easy manual access to each of the lockers and to the control unit. Optionally, the lockers may be packaged so that the system can be installed outdoors.

The control unit is connected, by wired or wireless connections, to each of the lockers, so that the processor can turn the indication lamp on and off, can lock and unlock the door, can know if the locker is vacant or occupied, and can know if the door is closed or open.

The following is a description of how this embodiment of the item transfer facility functions in the four modes of operation described above:

1. Delivery of packages by the shipping operator
2. Collection of returned packages by the shipping operator
3. Pick-up of a package by a customer
4. Returning of a package by a customer 1. Delivery of Packages by the Shipping Operator In this embodiment of the invention, the shipping operator identifies him/herself and the shipping company to the control unit by a magnetic card or by any other means of identification.

The control unit confirms that the shipping company is a valid deliverer to this container, and optionally may confirm that the operator is a valid representative of this shipping company. The control unit optionally informs the operator of the number of vacant lockers, and the number of packages in the lockers waiting to be returned.

At that point, the controller can optionally communicate with a central database and learn the list of packages that are expected to be delivered by this shipping company at this delivery session, so that it does not need to establish communication for each individual package.

The operator takes the first package that is addressed to this container from the truck, and inputs the relevant information about the package into the control panel. This can be accomplished in a variety of ways. For example, this could be accomplished by using information on the package label such as a bar-code. In this example, the operator holds the package against the container's scanner—in the same way that a cashier in a grocery store holds an item against the barcode reader.

The bar code has at least a shipment number. It can optionally contain additional information.

Once the bar code has been read, the controller produces an audible indication, and assigns a vacant locker to this package. As the lockers may be of different sizes, the controller can optionally use the information retrieved about this delivery, to assign a proper size locker to the package. Then the controller unlocks the assigned locker, displays or pronounces the locker number, and turns on the visual indicator on the door of the locker.

The delivery operator then recognizes the assigned locker, takes the package to the locker, opens the door of the locker and places the package in the locker, and closes the door.

The controller then updates its records to indicate that that locker is now occupied, and records the shipping number of that package, a resident in that locker. The controller also confirms that the door is closed, and locks the door of that locker.

The shipping operator then takes the next package from the truck and repeats this operation until all packages to this container are delivered.

Optionally, the controller will not assign a locker to a package that is does not appear in the database as belonging to this container. This will help reduce delivery errors.

Optionally, the controller will not assign a locker for the next package, if the door of the previous locker has not been properly closed and locked. This will reduce mishandling errors.

Upon completion of the delivery, the shipping operator identifies itself again to close the delivery session. Optionally, a receipt is printed for the shipping operator, indicating the time and identity of packages delivered. Optionally a status check is run by the system to check that the operator has properly completed the session, and hold the operator's identification card or other deposit until the status check is completed satisfactorily.

2. Collection of Returned Packages by the Shipping Operator

In this embodiment of the invention, upon identifying the shipping company, the processor displays the numbers of the lockers that contain packages to be returned to that shipping company, and unlocks the doors of these lockers, and turns on the visual indication on these lockers.

The shipping operator then visits all the highlighted lockers, opens the doors and clears the content of the lockers into the truck.

When done, the shipping operator signs out at the controller. The controller then confirms that all return-lockers are vacant and the doors are closed. If there is any locker left open or occupied, the controller alerts the shipping operator to correct this.

The lockers are then locked and the local locker-base is updated to indicate that they are vacant.

Optionally a status check is run by the system to check that the operator has properly completed the session. Optionally, the system will hold an operator's identification card or other deposit until the status check is completed satisfactorily.

3. Pick-Up of a Package by a Customer

In this embodiment of the invention, a customer can approach the container control unit and identify him or herself. Identification may take the form of swiping their credit card, entering a pre-assigned pass code, or other action.

The controller then checks whether the container is holding any packages that this consumer is authorized to pick up. If it is, it determines which locker(s) they are located in. (Authorized packages may include those purchased with this card, and all items purchased with cards that belong to the same entity, like family or business, etc.).

The controller then turns on the indications on the lockers and unlocks the doors. It also displays the numbers of lockers. The customer then opens the doors of the lockers and picks up the packages.

The controller senses that the lockers are vacant, and that the doors are closed. It locks the doors and marks these lockers as vacant.

Optionally the controller updates a central database that the packages have been picked up.

Optionally a status check is run by the system to check that the customer has properly completed the session. Optionally, the system will hold the customer's identification card or other deposit until the status check is completed satisfactorily.

4. Returning a Package by a Customer

In this embodiment of the invention, a customer can use the container to return a product to the vendor. The customer begins by approaching the control unit and identifying themselves with their credit card or another means of identification.

Optionally, the customer then holds the package in front of the bar code reader, so that the controller can identify the package.

The controller using pre-existing rules or through instructions from a remote database or operator may elect to accept this return. If it does, it will assign an empty, appropriately sized locker to the specific return.

The rules of what can be returned may vary, but basically the controller needs to relate the returned package to a specific shipping company that will download it, and needs to know the dimensions of the package in order to assign a locker. The customer can input both parameters, but it is always preferable to retrieve them from a reliable source, and to communicate with a central database for this information. Also, designation of a shipping company can be made later by the system, for example in response to bidding by shipping companies for the specific return.

The communication with a central database can also be omitted, for example, if the rules are that one can return to a container only if the package has been delivered originally through the same container, and the information about the package is already available.

Once an empty locker had been assigned and unlocked, the customer can go to that locker, open the door, place the package there and close the door.

Once the computer senses that the door is closed, it locks the door and updates its records.

Optionally, the controller will print a receipt for the customer, listing the lockers that were assigned for their returned items.

Optionally a status check is run by the system to check that the customer has properly completed the session. Optionally, the system will hold the customer's identification card or other deposit until the status check is completed satisfactorily.

The following is a technical description of possible embodiments of the components of the system:

The processor: this can be any digital processor, such as a ruggedised personal computer.

The bar-code reader: this is preferably a multidirectional barcode scanner that uses a laser beam and a rotating polyhedral mirror to scan the label in many directions and automatically detects a valid readout. Such readers can be found in any grocery cashier's station. Alternately or in addition, this unit may include of a variety of other package identification technologies.

The magnetic swipe reader: a suitable type of magnetic swipe reader can be the swipe card reader catalog number 21080205, produced by of POS Peripherals, Inc., from 1714 Shadowood Parkway SE, Atlanta, Ga. 30339 that is connected to a personal computer through the serial port. Alternately or in addition, this unit may include of a variety of other customer and operator identification technologies.

The door lock: this can be any electromagnetic lock such as the lock of an elevator door or the lock of a car door.

The Vacancy/Occupancy Sensor

Figure 7:
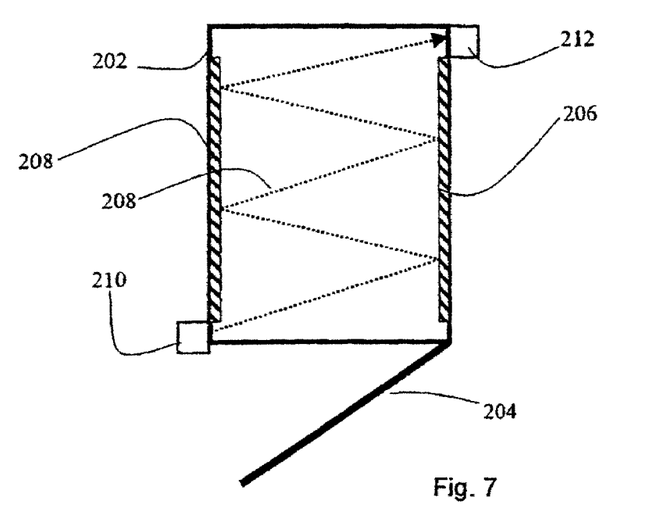
FIG. 7 is a schematic drawing of an exemplary type of vacancy detection sensor mechanism useful in conjunction with a storage locations provided in the form of a locker, in accordance with an embodiment of the present invention.

Reference is now made to FIG. 7, which is a schematic drawing of an optical sensor mechanism for detection of vacancy of a locker.

This sensor is an example for an inexpensive and reliable detection of any object that is placed in the locker's floor. One possible embodiment, is illustrated in FIG. 7 with is a simplified top view of a locker 202 having a door 204. Two rectangular mirrors 206 and 208 are attached to the left and right walls of the locker, extending through most of the depth of the locker in length, and from the bottom of the locker to a height of approximately 1" in width. The reflective side of the mirrors is facing each other, and the mirrors are installed so that their reflective planes are substantially parallel to each other.

A source of light 210 which is installed on the bottom of the container near or inside one of the walls, sends a horizontal beam of light 212 in a direction that is reflected from one mirror to the other several times, until it is reached a photosensitive cell 212 near the rear edge if the container.

Any package placed on the floor of the locker will disturb the zig-zag reflection of the light, and will thus be detected by the photocell.

The door indicator: this can be a simple light indicator such as in an elevator control panel The door sensor: this can be a microswitch such as can be found in any car door or car trunk door (for switching on the lights when open)

Variable Size Lockers

Referring now to FIGS. 9a-11b, there are illustrated three different embodiments of locker arrays in accordance with the present invention, in which the partitions between the lockers are movable so as to maximize the storage efficiency thereof. It will be noted that, while each of the arrays is seen to have eight lockers, this is for example only; clearly, an array may have fewer lockers, or may have many more, up to hundreds or even thousands of lockers in large scale facilities in city centers.

Figure 9A:
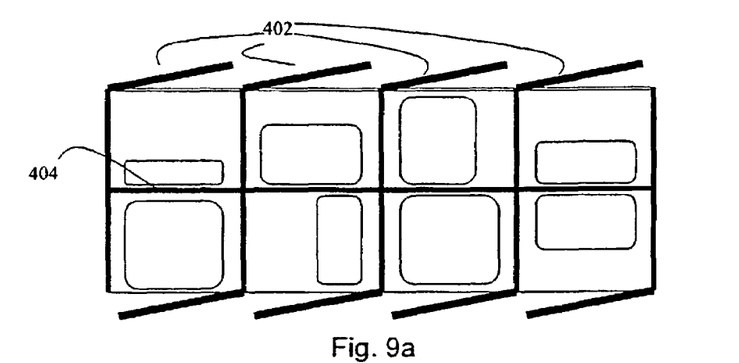

In more detail, FIG. 9a shows a top view of an array of eight lockers with their doors 402 slightly open. The back wall 404 of the lockers are all aligned, such that each has the same volume.

Figure 9B:
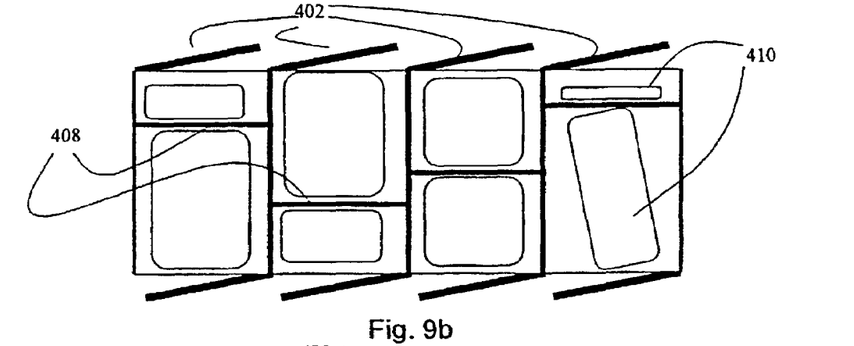

In FIG. 9b, there is seen a top view of an alternative array of eight lockers, where the back walls 408 of the lockers can be moved forwards and backwards, thus increasing the volume of one locker on account of the opposite locker, thereby to optimize use of the available storage space.

Figure 10A:
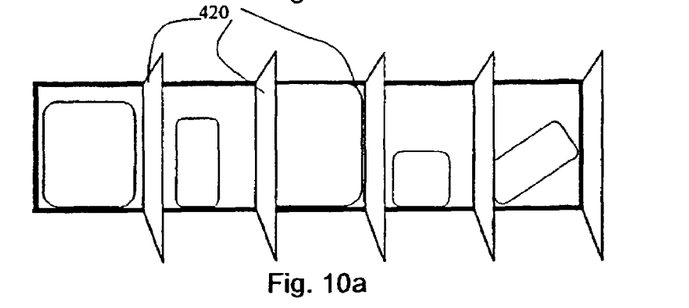

FIG. 10a shows a front view of an array of eight lockers with their doors 420 wide open. The partitions between neighboring lockers are fixed such that each has the same volume.

Figure 10B:
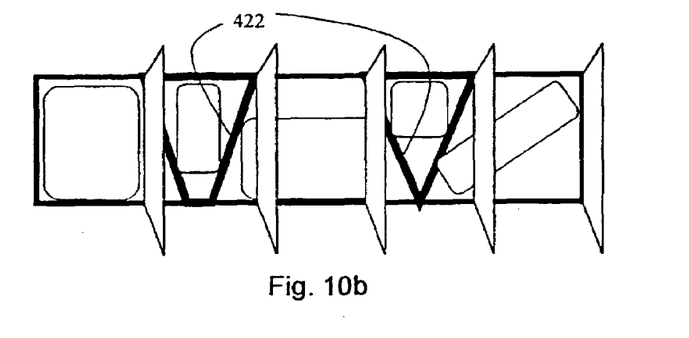

In FIG. 10b, there is seen a front view of an alternative array of eight lockers, where the partitions can be slanted around an horizontal axis, thus giving the locker a trapezoidal prism shape, allowing for better storage efficiency and increasing the volume of the bottom part of one locker by reducing the volume of the neighboring locker.

Figure 11A:
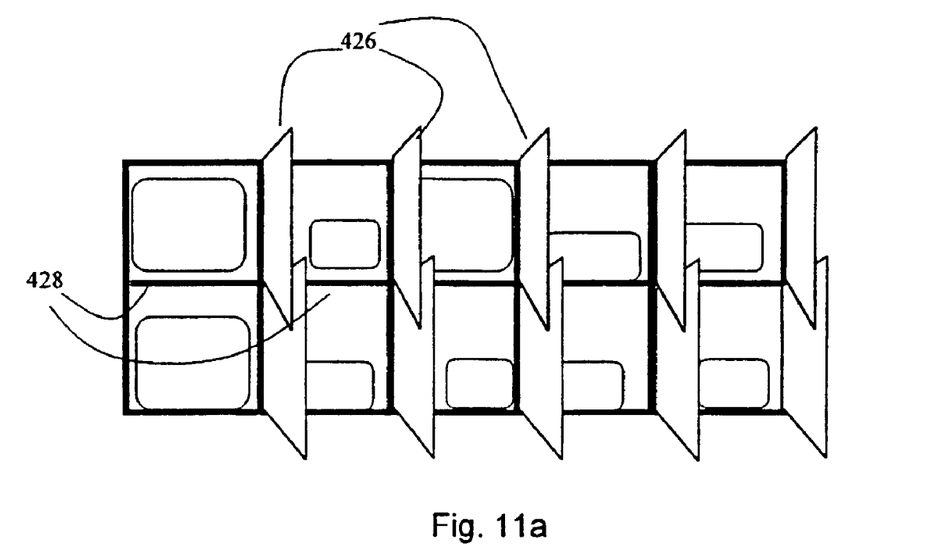

FIG. 11a shows a front view of an array of eight lockers with their doors 420 wide open. The floor of the top lockers, which is also the ceiling of the bottom lockers, are fixed, giving all lockers the same volume.

Figure 11B:
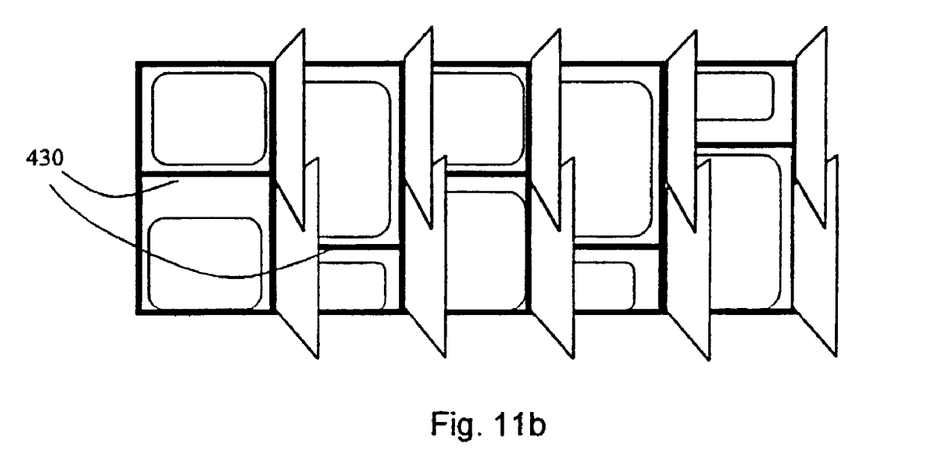

Referring finally to FIG. 11b, there is seen a front view of an alternative array of eight lockers, where the floor 430 of the top lockers, which is also the ceiling of the bottom lockers, can be moved up or down, allowing for better storage efficiency and increasing the volume of the one locker by reducing the volume of the neighboring locker below or above it.

It will be appreciated by persons skilled in the art that the scope of the present invention is not limited to that which had been shown and described hereinabove, merely by way of illustrative example. Rather, the scope of the present invention is limited solely by the claims, which follow:

The invention claimed is:

1. A method for transferring a package from a sender to a recipient, which includes the following steps:
    assigning a unique package identifier to a package to be transferred;
    accepting delivery of the package by a shipping company to a selected one of a plurality of networked holding locations each located on the premises of a respective site selected for its centrality and/or general convenience to a target community or market such that consumers may visit the site at any convenient time to collect delivered items from the holding location;
    confirming an identity of the shipping company by a control unit of the selected holding location;
    machine identifying the package at the holding location by means of the unique package identifier;
    receiving and storing the package at the holding location for retrieval thereat by an authenticated recipient, the package being stored at the holding location in a locked container constructed to be secure against vandalism and theft,
    wherein the holding location to which the package is delivered is selected from among the plurality of networked holding locations based on at least one of the list of parameters which includes:
        the identity of an intended recipient of the package;
        the preferred delivery address of the recipient of the package;
        the preferred timing of delivery of the package; and
        the delivery status of the package;
    notifying the recipient when the package has been received at the holding location by way of an electronic message delivered to a portable terminal or via e-mail;
    authorizing release to the authenticated recipient of the package stored at the holding location; and
    releasing the package from the locked container to the authenticated recipient.

2. A system for the asynchronous transfer of items from a sender to an addressee, the system comprising:
    an asynchronous item transfer facility located on the premises of a site selected for its centrality and/or general convenience to a target community or market, the asynchronous item transfer facility comprising:
        at least one storage structure containing a plurality of locked storage containers for items selected for delivery, the locked storage containers being constructed to be secure against vandalism and theft,
        a first sub-system for confirming an identity of a shipping company delivering items sent from a sender to the asynchronous item transfer facility via the shipping company, and for routing the items to available storage containers in said storage structure;
        a second sub-system, associated with said first sub-system, for informing an addressee of the presence of an item designated for said addressee in said storage structure by way of an electronic message delivered to a portable terminal or via e-mail;
        a user interface for facilitating selection by a user of one or more modes of operation, including a pick up request by an addressee;
        a third sub-system for authenticating the identity of an addressee; and
        a fourth sub-system, associated with said third sub-system, facilitating the retrieval by the authenticated addressee of an item addressed thereto, from said storage structure.

3. The system of claim 2, wherein said plurality of storage containers includes a plurality of non-pre-assigned storage containers.

4. The system of claim 2, wherein said storage structure is an automated robotic storage container.

5. The system of claim 2, wherein said storage structure is an array of lockers connected to a remote control and monitoring facility.

6. The system of claim 5, wherein said array of lockers are separated by movable partitions.

7. The system of claim 2, wherein said second sub-system includes a data transfer system operative to communicate with a computerized transaction interface so as to display item location data thereat.

8. The system of claim 2, wherein said second sub-system includes a data transfer system operative to communicate with a portable communication device so as to display item location data thereat.

9. The system of claim 2, also including apparatus for providing predetermined environmental storage conditions in at least predetermined ones of said storage containers, required for suitable storage of known addressed items.

10. The system of claim 9, wherein said apparatus for providing environmental storage conditions including cooling apparatus.

11. The system of claim 2, wherein said first sub-system for receiving items from a sender and for routing the items to available storage containers in said storage structure, includes an automatic conveying system.

12. The system of claim 2, comprising a plurality of said item transfer facilities each located on the premises of a respective site accessible to members of the public, wherein respective information systems of all of the item transfer facilities are linked to a central database by a wide area network.

* * * * *

UNITED STATES PATENT AND TRADEMARK OFFICE
CERTIFICATE OF CORRECTION

| | | Page 1 of 1 |
|---|---|---|
| PATENT NO. | : 7,693,745 B1 | |
| APPLICATION NO. | : 10/111601 | |
| DATED | : April 6, 2010 | |
| INVENTOR(S) | : Pomerantz et al. | |

It is certified that error appears in the above-identified patent and that said Letters Patent is hereby corrected as shown below:

On the Title page,

Insert the following:

Item    --Related U.S. Application Data

(60) Provisional Application No. 60/161,716, filed on Oct. 27, 1999, Provisional Application No. 60/181,898, filed Feb. 11, 2000.--.

Signed and Sealed this
Fifth Day of July, 2011

David J. Kappos
*Director of the United States Patent and Trademark Office*